Jan. 5, 1960 R. H. ANDRESEN ET AL 2,919,939
HIGH TEMPERATURE SHAFT SEAL
Filed July 2, 1957

Inventors
RAYMOND H. ANDRESEN
HILMAR A. ANDRESEN
by Hill, Sherman, Meroni, Gross & Simpson Attys.

United States Patent Office 2,919,939
Patented Jan. 5, 1960

2,919,939

HIGH TEMPERATURE SHAFT SEAL

Raymond Hilmar Andresen and Hilmar A. Andresen, Barrington, Ill., assignors to Gits Bros. Mfg. Co., Chicago, Ill., a corporation of Illinois Application July 2, 1957, Serial No. 669,476

2 Claims. (Cl. 286—11.12)

This invention relates generally to sealing devices and more particularly to a rotating shaft sealing arrangement for use in a high temperature environment.

It is frequently necessary to provide a rotating shaft sealing device in a temperature environment of 650 to 1000° F. Such operating conditions preclude the use of rubber or plastic components which are contemporaneously employed in connection with the resilient mounting of one or more members of a seal assembly in which the sealing members present confronting seal faces to accommodate wear and shaft expansion or contraction.

In accordance with the principles of the present invention, there is provided a coupling-type seal wherein a coupling means is interposed between coaxially separated shaft parts, one of the shaft parts being located in an enclosure containing fluid under pressure and the coupling means including a wear ring which is continuously biased towards a stationary seal ring positioned and mounted on one wall of the enclosure through which the rotatable shaft means is adapted to extend. By virtue of such construction, all rubber or plastic compounds are eliminated and an efficient seal for the shaft is provided.

It is an object of the present invention, therefore, to provide an improved high temperature shaft seal.

Another object of the present invention is to provide a seal construction which eliminates the need of rubber or plastic compounds or other materials which readily deteriorate under a high temperature environment.

Many other features, advantages and additional objects of the present invention will become manifest to those versed in the art upon making reference to the detailed description which follows and the accompanying sheet of drawings in which a preferred structural embodiment of a seal construction embodying the principles of the present invention is shown by way of illustrative example.

Figure 1:
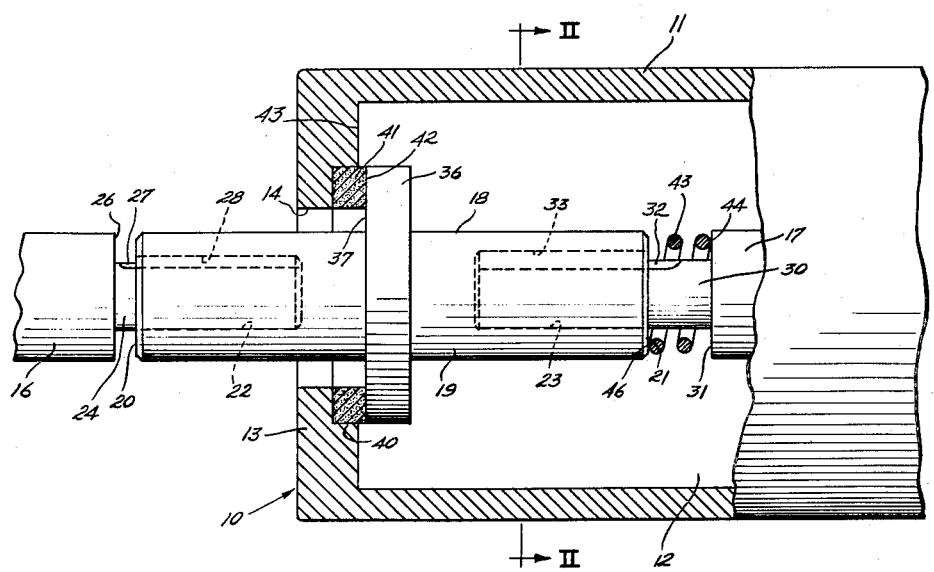
Figure 1 is a fragmentary cross-sectional view showing a seal construction incorporating the principles of the present invention.
Figure 2:
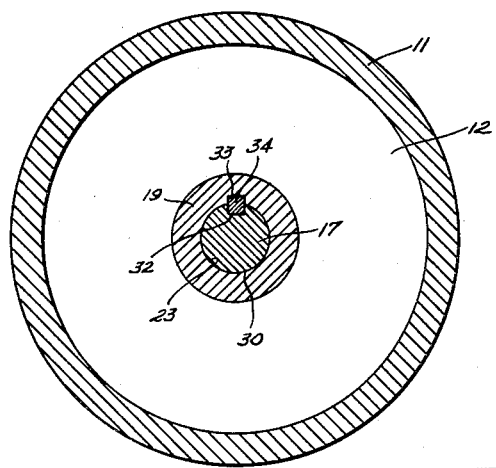
Figure 2 is a cross-sectional view taken generally on line II—II of Figure 1.

The seal construction of the present invention is indicated generally at 10. There is indicated somewhat diagrammatically an enclosure 11 in which is present and in which is contained a fluid to be sealed. Thus, there is provided a cavity or space 12 containing either a gaseous or a liquid fluid under increased pressure. The enclosure 11 has a wall 13 formed with an opening 14 through which a shaft means is adapted to extend. The particular operating environment contemplated is that in which extremely high temperatures are encountered, for example, in the range of 650 to 1000° F. and the particular problem solved in accordance with the principles of the present invention is to establish a shaft seal for the rotatable shaft means extending through the opening 14 of the enclosure 11.

The rotatable shaft means of the present invention include separate coaxial parts. For example, a first shaft part is indicated at 16 and may conveniently comprise a power take-off, while the second shaft part is indicated at 17 and may conveniently comprise a drive shaft for supplying a driving torque to the shaft part 16.

In accordance with the principles of the present invention, coupling means indicated generally at 18 extend between the shaft parts 16 and 17 and interconnect the same for corotation.

As shown in Figure 1, one of the shaft parts, namely, in this embodiment the shaft part 17, is within the interior of the space 12 of the enclosure 11, while the shaft part 16 is on the outside of the enclosure 11. The coupling means 18 takes the form of a sleeve-like or generally cylindrical body member 19. The body portion of the coupling member 19 has end faces 20 and 21, each particularly characterized by an axially extending recess identified in the drawings at 22 and 23, respectively.

The shaft part 16 has a reduced diameter section 24 on the end thereof which is telescopically received within the recess 22. A radially extending shoulder 26 is formed between the reduced section 24 and the remaining portion of the shaft part 16.

Suitable locking means are formed between the internal walls of the recess 22 and the external peripheral surface of the reduced section 24 such as splines or tongue and groove locking means so the coupling member 19 and the shaft part 16 will be locked for corotation but axial movement of the coupling member 19 will be accommodated. By way of illustrative example, the present embodiment shows the peripheral surface of the reduced section 24 formed with a longitudinally extending groove 27 and the walls of the recess 22 are also provided with a longitudinally extending groove 28. A key member is conveniently inserted during assembly in the grooves 27 and 28, thereby accomplishing the objectives desired.

In like manner, the shaft part 17 is provided with a reduced section 30, thereby forming a radially extending shoulder 31 inwardly from one end of the shaft part 17. The reduced section 30 is formed with a longitudinally extending groove 32 and the walls of the recess 23 are formed with a confronting longitudinally extending groove 33, thereby to accept a key member 34 which operates to lock the coupling member 19 and the shaft part 17 for corotation while accommodating relative axial movement between the coupling member 19 and the shaft part 17.

The coupling member 19 of the present invention is particularly characterized by the wear ring 36 projecting radially outwardly from the peripheral surface of the coupling member 19 and formed to provide a radially extending surface 37 which overlies the edges of the opening 14.

The wall 13 of the enclosure 11 is also characterized by the provision of a stationary seal ring presenting a seal face for sealing engagement with the wear ring 36. In this particular embodiment, the wall 13 has an annular recess 40 formed therein surrounding the inner longitudinal edge of the opening 14 to receive and seat a seal ring indicated at 41 and constituting, by way of example, a carbon sealing ring. The ring 41 is proportioned to form a seal face 42 which projects into the space 12 beyond the inner surface 43 of the wall 13. Thus, the face 42 confronts the face 37 on the wear ring 36.

In order to insure loaded sealed engagement between the wear ring 36 and the carbon ring 41, continuous biasing means are provided to move the coupling means 18 axially. In this embodiment, it will be noted that a coil spring 43 is provided having one end bottomed against the shoulder 31 as at 44 and having the opposite end bottomed against the end of the coupling member 19 as at 46.

By virtue of the construction thus provided, the need of all rubber or plastic compounds is completely eliminated since all of the components of the coupling-type seal disclosed herein can be made of materials which resist deterioration in a high temperature operating environment.

Although various minor structural modifications might be suggested by those versed in the art, it should be understood that we wish to embody within the scope of the patent warranted hereon all such modifications as reasonably and properly come within the scope of our contribution to the art.

We claim as our invention:

1. Means for sealing a rotatable shaft which comprise, shaft means including first and second coaxial separate shaft parts, an enclosure having fluid under pressure herein and including a wall having an opening through which the shaft means is adapted to extend, one of the shaft parts being disposed inside of said enclosure, a stationary seal ring in said wall around said opening and having a seal face disposed radially with respect to the axis of the shaft means and spaced to project axially into said enclosure from said wall, coupling means including a generally cylindrical member recessed at opposite ends to telescopically receive said shaft parts, said cylindrical member and said shaft parts having axially extending tongue and recess means therebetween to couple the shaft parts for corotation while accommodating axial movement of said cylindrical member, means forming a wear ring on said cylindrical member having a radial face confronting said seal face, and a continuous biasing means between said shaft means and said coupling means to load the wear ring and the seal ring into sealing relation with one another.

2. Means for sealing a rotatable shaft which comprise, shaft means including first and second coaxial separate shaft parts, an enclosure having fluid under pressure therein and including a wall having an opening through which the shaft means is adapted to extend, one of the shaft parts being disposed inside of said enclosure, a stationary seal ring in said wall around said opening and having a seal face disposed radially with respect to the axis of the shaft means and spaced to project axially into said enclosure from said wall, coupling means including a generally cylindrical member recessed at opposite ends to telescopically receive said shaft parts, said cylindrical member and said shaft parts having axially extending tongue and recess means therebetween to couple the shaft parts for corotation while accommodating axial movement of said cylindrical member, means forming a wear ring on said cylindrical member having a radial face confronting said seal face, said one shaft part having an enlarged radial shoulder spaced from the end of the adjoining end of said cylindrical member, and a coil spring bottomed at one end against said shoulder and at the other end against said cylindrical member to load said wear ring and said sealing ring into sealing relation with one another.

References Cited in the file of this patent

UNITED STATES PATENTS

| | | |
|---|---|---|
| 2,060,209 | Heckert | Nov. 10, 1936 |
| 2,192,588 | Heckert | Mar. 5, 1940 |
| 2,665,636 | Lauck et al. | Jan. 12, 1954 |
| 2,801,593 | Mossbacher | Aug. 6, 1957 |

FOREIGN PATENTS

| | | |
|---|---|---|
| 160,528 | Switzerland | May 15, 1933 |